United States Patent
Sakata et al.

[11] Patent Number: 5,981,877
[45] Date of Patent: Nov. 9, 1999

[54] NOISE-PREVENTION GROMMET AND PROCESS FOR MANUFACTURING THE SAME

[75] Inventors: Tsutomu Sakata; Takahiro Kato, both of Yokkaichi, Japan

[73] Assignee: Sumitomo Wiring Systems, Ltd., Yokkaichi, Japan

[21] Appl. No.: 08/904,350

[22] Filed: Jul. 31, 1997

[30] Foreign Application Priority Data

Aug. 1, 1996 [JP] Japan .................................. 8-203612

[51] Int. Cl.⁶ .................................................. H01B 17/26
[52] U.S. Cl. ...................... 174/153 G; 174/167; 248/56; 439/567
[58] Field of Search ................ 174/31 R, 65 R, 174/65 G, 135, 151, 152 G, 153 G, 153 R, 167, 152 R; 156/245, 307.1; 248/56; 439/207, 208, 449, 456, 567, 548, 556, 559, 462; 264/248, 250

[56] References Cited

U.S. PATENT DOCUMENTS

| | | | |
|---|---|---|---|
| 4,692,562 | 9/1987 | Nattel .................................. | 174/65 SS |
| 4,738,636 | 4/1988 | Bolante .................................. | 439/462 |
| 5,270,487 | 12/1993 | Sawamura . | |
| 5,337,447 | 8/1994 | Tanaka et al. ............................. | 16/2.2 |
| 5,448,017 | 9/1995 | Nakajima et al. . | |
| 5,526,549 | 6/1996 | Mori et al. . | |
| 5,537,714 | 7/1996 | Lynch, Jr. et al. .......................... | 16/2.1 |

FOREIGN PATENT DOCUMENTS 7105774 4/1984 Japan .

Primary Examiner—Kristine Kincaid
Assistant Examiner—Dhiru R Patel
Attorney, Agent, or Firm—Greenblum & Bernstein P.L.C.

[57] ABSTRACT

A grommet used in an automobile reduces noise leakage from the engine compartment to the passenger compartment. It is made of rubber or an elastomer, and it includes a small tube portion, through which a wiring harness is passed, a frustoconical tube portion flaring from an edge of the small tube portion and a flared portion, on the outer surface of which is formed a recess for fitting into a body panel. An internal tube portion through which the wiring harness is passed extends axially from the small tube portion in the frustoconical tube portion, and a closing portion is connected to the flared portion and to the edge of the internal tube portion distal to the edge of the small tube portion.

13 Claims, 10 Drawing Sheets

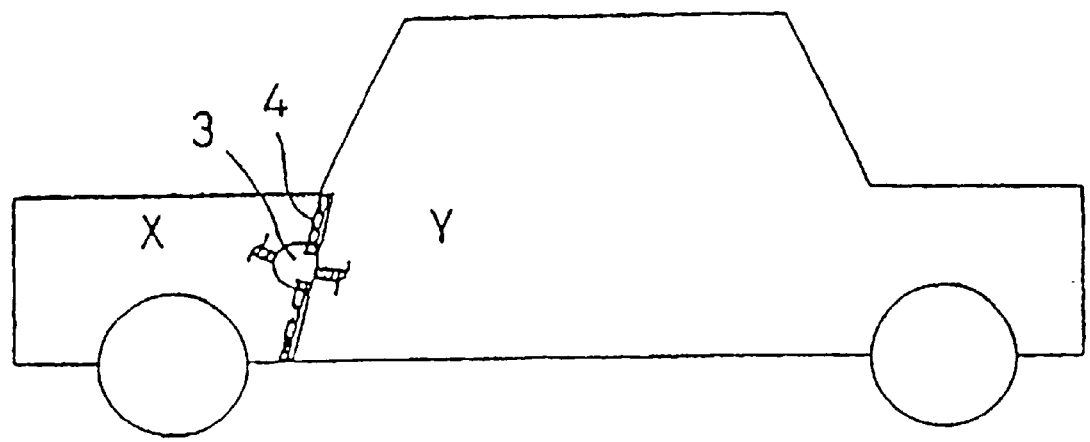
FIG.1 – PRIOR ART
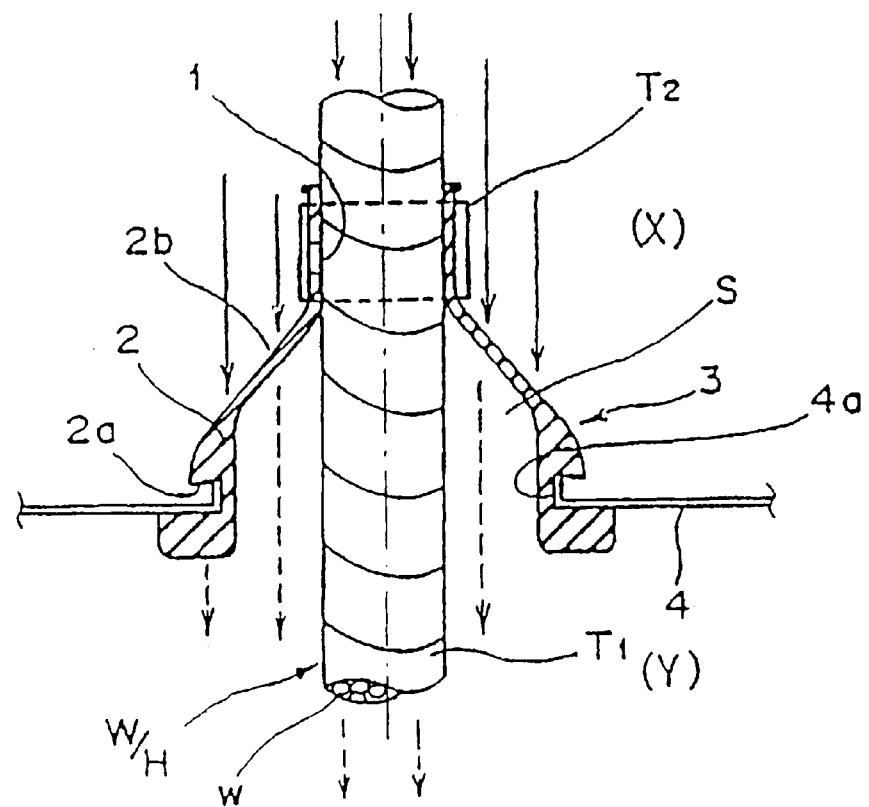
FIG.2 – PRIOR ART

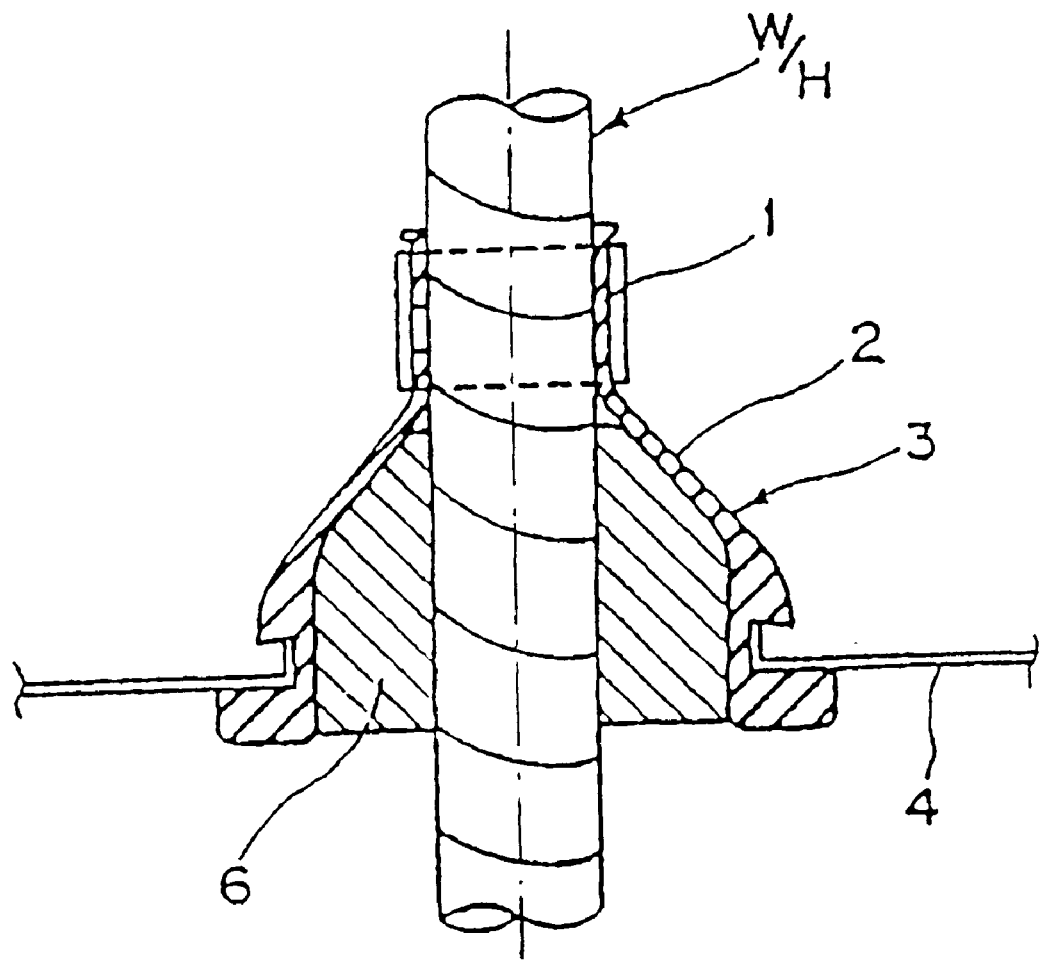
FIG.3 – PRIOR ART

NOISE-PREVENTION GROMMET AND PROCESS FOR MANUFACTURING THE SAME

BACKGROUND OF THE INVENTION

1. Field of the Invention

The present invention relates to a noise-prevention grommet used in an automobile. More particularly, the invention relates to a grommet fixed to a wiring harness and an automobile body panel which partitions an engine compartment and a passenger compartment. The grommet is positioned at the intersection of the harness and the body panel, such that it prevents water and dust penetration from the engine compartment to the passenger compartment. Moreover, it improves noise insulation.

2. Discussion of Background Information

As shown in FIG. 1, when a harness is wired through the body panel 4 which partitions the engine compartment X and the passenger compartment Y, a known grommet 3 is fixed on the body panel and shields the passenger compartment Y from water and dust.

As shown in FIG. 2, the known grommet 3, made of a rubber or an elastomer, is an integral piece having two portions. One is a small tube portion 1 to be fixed on the circular surface of the wiring harness. The other is a frustoconical tube portion 2 flaring therefrom.

Electrical cables W are first bundled, then a tape T1 is helically wound thereon to create the wiring harness. The harness is passed through the grommet 3 and is fixed by firmly winding a tape T2 around the small tube portion 1 from the outside. The frustoconical tube portion 2 is provided with a fitting recess 2a on the outer circular surface of its flared end portion, while the body panel 4 is provided with a through-hole 4a. When mounting grommet 3 and a wiring harness W/H to an automobile, the grommet 3 is passed through the hole 4a, such that the rim of hole 4a is fitted in recess 2a.

The installation of grommet 3 and harness W/H into hole 4a of body panel 4 can be done either from the passenger compartment or the engine compartment. In either case, it is necessary to deform the frustoconical tube portion 2 when passing grommet 3 through hole 4a. The frustoconical tube portion 2 thus has a thinly constructed flaring portion 2b.

Noise generated in the engine compartment X (shown by arrows in FIG. 2) is transmitted through a thinner portion of the frustoconical tube portion 2 towards the inside of the grommet 3. The transmitted noise (shown by dotted arrows) passes therefrom through a space S formed between the external surface of the harness and the internal surface of the grommet, then into the passenger compartment Y.

The problem of noise-shielding has not been taken into account in the known grommet, so that the passenger compartment is rendered somewhat less comfortable because of this noise diffusing through the path hole of the harness.

To reduce the noise in the passenger compartment, it is proposed to fill the space S beforehand with a rigid material 6, as shown in FIG. 3. However, this rigid material makes it difficult to pass the wiring harness through the grommet. Another possible method is to fill space S with a sealing agent. However, this method adds another working step, i.e., the step of filling with a sealing agent.

Moreover, according to the above methods, the rigid material 6 or the solidified sealing agents prevent the grommet from deflecting, so that positioning the body panel becomes difficult. In addition, the wiring harness W/H becomes less flexible in the region where it passes through the grommet, so that positioning the wiring harness in the car body becomes more difficult. Accordingly, in the past, attempts to reduce the transmitted noise led to decreased workability.

SUMMARY OF THE INVENTION

An object of the present invention is to provide a grommet having an improved acoustic performance and also a high workability without losing the flexibility of the grommet and the flexibility of the wiring harness.

To this end, there is provided a grommet comprising a small tube portion through which a wiring harness is passed and having an edge at one end thereof. A frustoconical tube portion flares from the edge of the small tube portion and has a flared-out portion and an inner and outer surface, on the outer surface of which is formed a recess for fitting into a car body panel. An internal tube portion through which the wiring harness is passed extends substantially axially from the small tube portion through the frustoconical tube portion, and has an open edge and an outer surface. A closing portion has a through-hole being substantially centrally located, the closing portion being connected to the open edge of the internal tube portion and to the flared-out portion of the frustoconical tube portion, whereby there is provided a cross-sectionally circular closed space surrounded by the outer surface of the internal tube portion, the inner surface of the frustoconical tube portion and the closing portion.

The closing portion may have the shape of a disk with a central hole.

The closed space thus formed provides an air cushion. It absorbs the noise coming from the engine compartment through the wall of the frustoconical portion of the grommet, and reduces or suppresses the noise penetrating from the closed space into the passenger compartment. The air cushion thus improves noise shielding. Further, the noise is shielded solely by virtue of providing a closed air cushion, so that the frustoconical tube portion retains its flexibility. Further, the grommet is easily deformed when passing through the hole in the body panel, so that it is easily mounted in the panel. As a consequence, the wiring harness passing through the grommet is kept flexible and the harness can be easily wired.

The grommet may be integrally formed from an elastic material. This material may be rubber or an elastomer.

The grommet may further comprise a flange portion for holding a dash silencer with the flange portion depending from the open edge of the internal tube portion. The flange portion may include a tubular portion and an open end portion, the open end portion extending radially outwardly. At least the internal tube portion and the closing portion are preferably formed of a high-density elastic material. Such a high density material prevents noise penetration and improves noise shielding. These two portions constitute a direct noise passage to the passenger compartment, hence the advantage of forming these portions with a high-density material. The whole grommet can, of course, be manufactured with such a material. However, as high-density material is expensive, manufacturing cost will increase.

Preferably, the grommet comprises a plurality of internal wall portions which protrude radially and longitudinally from the outer surface of the internal tube portion, so that the cross-sectionally circular closed space is partitioned into a plurality of sections. Further, the cross-sectionally circular closed space may be filled with expanded material.

There is also provided a method of manufacturing a grommet, comprising:

a) integrally forming a small tube portion and a frustoconical tube portion into a grommet core part in a mold in the presence of a vulcanizing agent, whereby the grommet core part is half vulcanized;

b) integrally forming the internal tube portion and the closing portion into a grommet sub-part in another mold in the presence of a vulcanizing agent, whereby the grommet sub-part is half-vulcanized, and wherein the grommet core part and the grommet sub-part have corresponding binding sites;

c) putting a grommet core part and a grommet sub-part into a third mold, such that the corresponding binding sites are put into contact; and d) heating the third mold until both parts become fully vulcanized, whereby the corresponding binding sites are melted and bound together to yield the grommet.

The method may further comprise providing a flange portion for holding a dash silencer in the grommet sub-part. Preferably, the grommet sub-part is formed of a high-density material, while the grommet core part is formed of a lower-density material.

There is further provided a method of manufacturing a grommet comprising:

a) integrally forming a small tube portion, a frustoconical tube portion and an internal tube portion into a grommet core part in a mold in the presence of a vulcanizing agent, whereby the grommet core part is half-vulcanized;

b) forming a closing portion as a groomer sub-part in another mold in the presence of a vulcanizing agent, whereby the grommet sub-part is half-vulcanized, and wherein the grommet core part and the grommet sub-part having corresponding binding sites;

c) putting the grommet core part and the grommet sub-part into a third mold, such that the corresponding binding sites are put into contact; and d) heating the third mold until both parts become fully vulcanized, whereby the corresponding binding sites are melted and bound together, to yield the grommet.

The method may further comprise providing a flange portion for holding a dash silencer in the grommet sub-part. Preferably, the grommet sub-part is formed of a high-density material, while the grommet core part is formed of a lower-density material.

This grommet contains a closed space having a circular cross-section. Therefore, the methods need not contain a supplementary step of adding an anti-noise medium or a sealing agent, as is needed in the prior art. Production of the grommet is thus improved.

BRIEF DESCRIPTION OF THE DRAWINGS

The present invention is further described in the detailed description which follows, in reference to the noted drawings by way of non-limiting examples of preferred embodiments of the present invention, wherein:

FIG. 1 illustrates the location in an automobile where a known grommet is to be mounted;

FIG. 2 illustrates a known grommet through which a wiring harness is passed;

FIG. 3 illustrates a known grommet filled with a medium;

DETAILED DESCRIPTION OF THE PREFERRED EMBODIMENTS

Figure 4:
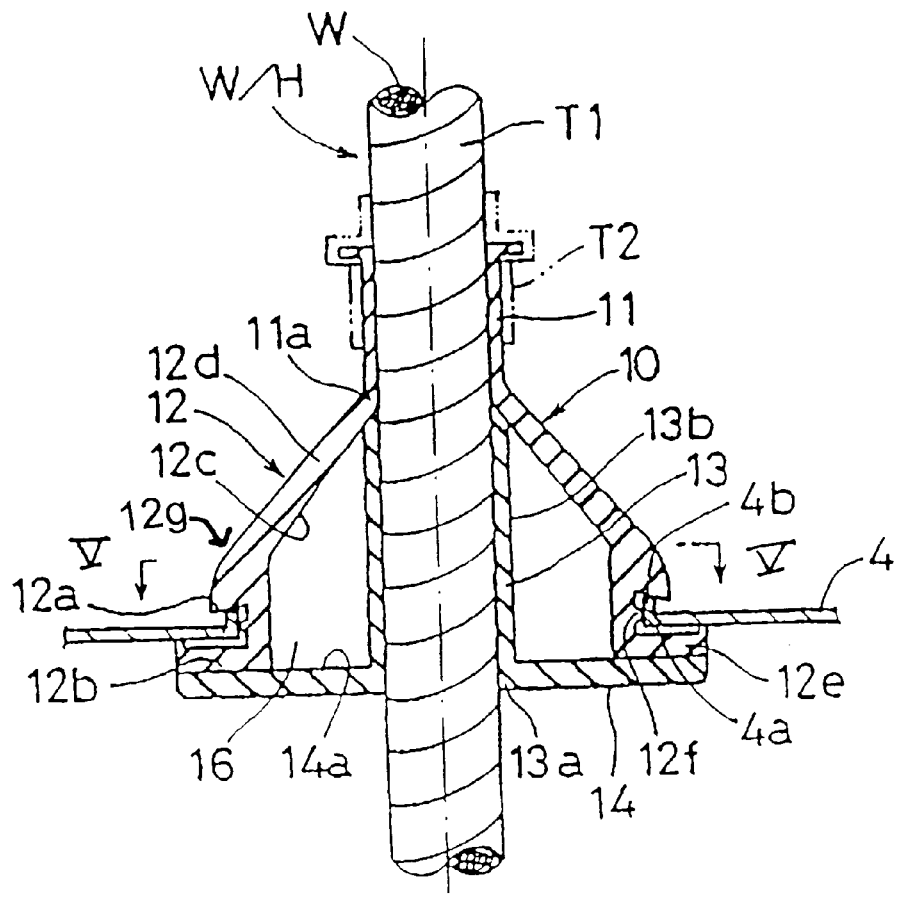
FIG. 4 illustrates the grommet according to a first embodiment of the present invention mounted in an automobile panel.
Figure 5:
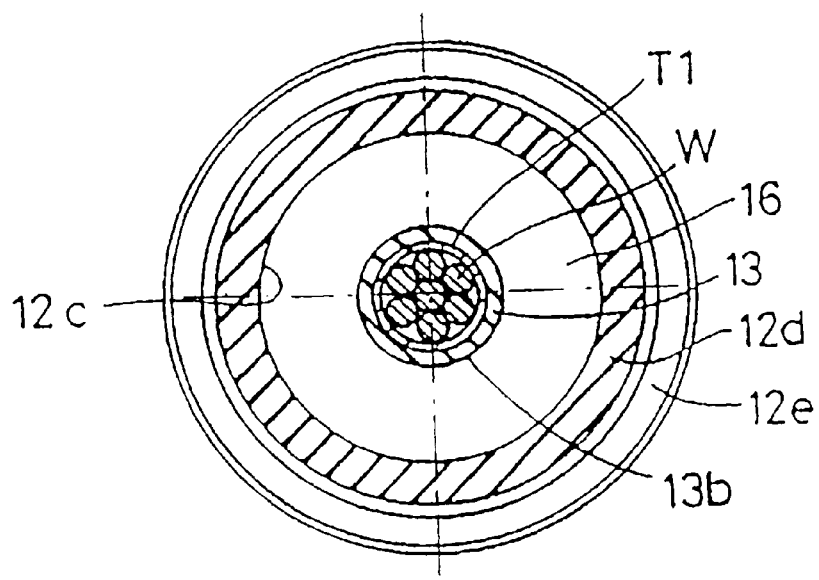
FIG. 5 illustrates a cross-section of the grommet depicted in FIG. 4 taken along line V—V.
Figure 6:
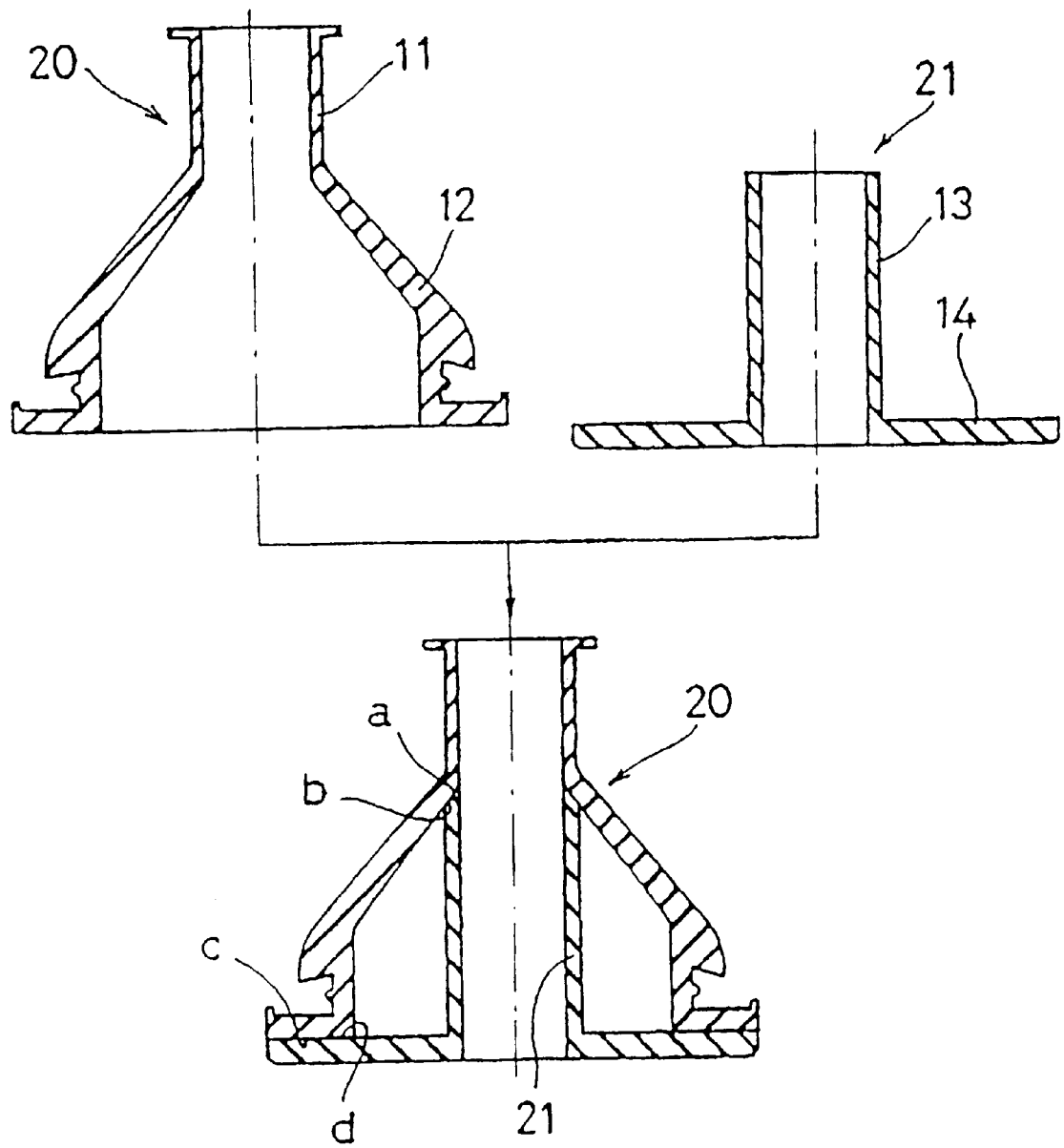
FIG. 6 schematically illustrates a process of manufacturing a grommet according to the embodiment of the present invention depicted in FIG. 4.

FIGS. 4–6 show a first embodiment of the grommet 10 of the invention. The grommet is integrally manufactured in rubber or an elastomer. It comprises a small tube portion 11 through which the harness is passed and tightly held. It also comprises a frustoconical tube portion 12 which is connected to an edge 11a of the small tube portion and flares therefrom in a frustoconical shape. The flared end portion has a fitting recess 12a on its outer circular surface 12g, to which recess is fitted the automobile body panel 4. The grommet further comprises an internal tube portion 13 which extends from the edge 11a of the small tube portion along the axial direction of the frustoconical tube portion 12, and the harness passes through internal tube portion 13. The grommet includes a closing portion 14 having the form of a disk which radially extends outwardly from the edge 13a of the internal tube portion 13 at the end thereof, opposite of the small tube portion 11, and is connected to the flared edge 12b of the frustoconical tube portion 12 and the outer circular surface 13b of the internal tube portion 13. The outer surface 13b, the inner circular surface 12c of the frustoconical tube portion 12, and the inner face 14a of the closing portion 14 define a closed space 16 of circular section.

The small tube portion 11 and the internal tube portion 13 have the same diameter and are linearly connected. FIG. 4 illustrates the grommet having been installed from the passenger compartment toward the engine compartment. The wiring harness W/H is formed by grouping electrical cables W and bundling them by a tape T1. The harness is then passed through both portions and tightly held. The frustoconical tube portion 12 has a flaring portion 12d and a sectionally thick portion at the flared edge, on the outer circular surface 12g of which is provided a panel-fitting recess 12a. The flared edge adjacent to the panel recess 12a extends radially outwardly and forms a fitting portion 12e behind the panel facing the passenger compartment Y. The panel-fitting recess 12a has a protrusion 12f on its base. As shown in FIG. 4, the rim of through-hole 4a formed in the body panel 4 is bent towards the engine compartment X, so as to form a bent portion 4b. The above-mentioned protrusion 12f is abutted against the corresponding face of the bent portion 4b.

The grommet 10 is manufactured as shown in FIG. 6. A grommet core part 20 comprised of a small tube portion 11 and a frustoconical tube portion 12 on the one hand, and a grommet sub-part 21 comprised of an internal tube portion 13 and a closing portion 14 on the other, are manufactured in separate molds (not shown) such that a vulcanizable rubber is filled in the cavity of the molds and heated. The heating temperature of the molds and the vulcanization temperature are adjusted depending on the type of rubber. When the grommet core part 20 and sub-part 21 are half-vulcanized (the surface becomes sticky), they are withdrawn from the molds.

Subsequently, the half-vulcanized core part 20 and sub-part 21 are put into another mold (not shown), such that the connecting sites of the core part 20 and those of the sub-part 21 are correspondingly placed. Those sites are the edge a of the small tube portion 11 against the edge b of the internal tube portion 11, and the edge c of the fitting portion 12e of the frustoconical tube portion 12 (to be located behind the panel facing the passenger compartment Y) against the corresponding surface d of the closing portion 14.

When the mold is closed and heated, the connecting sites are fused and integrated to yield the grommet 10 shown in FIG. 4.

As can be seen, the space 16 closed by internal tube portion 13, frustoconical tube portion 12 and closing portion 14 cannot be formed by one-step molding. Instead, core part 20 and sub-part 21 can be separately molded beforehand, up to a half-vulcanized state, then both are put into one common mold with the connecting sites arranged in the corresponding position. As both parts 20, 21 are still in a half-vulcanized state, they can be integrated by further heating. This procedure enables one to obtain an integrated grommet made of rubber and having a closed space 16 of circular section.

In order to pass the wiring harness W/H through the grommet 10 and install them in an automobile, the small tube portion 11 and the internal tube portion 13 are first enlarged by a grommet-expanding machine (not shown). The wiring harness W/H, provided with a connector at its one end, is passed therethrough from the side of the connector. As the internal tube portion 13 is surrounded with an air cushion contained in the closed space 16, the tube portion 13 can make use of its flexing and elastic properties and can be easily expanded, so that the workability of the wiring harness W/H is not impeded.

Once the wiring harness W/H is passed through the grommet 10, the tape T2 is wound around the end portion distal to the frustoconical tube portion of the small tube portion 11, and part of the harness W/H is fixed therein (shown by dotted lines in FIG. 4). The wiring harness W/H is thus fixed in the grommet 10 at a predetermined position.

The wiring harness W/H equipped with the grommet 10 is passed through through-hole 4a in body panel 4, either from the engine compartment X to the passenger compartment Y, or vice versa, by deflecting the frustoconical tube portion 12 of the grommet 10. As the frustoconical tube portion 12 contains an air cushion in its closed space 16, it can be easily deflected. Then, the rim of through-hole 4a is fitted in the recess 12a of the frustoconical tube portion 12. The protrusion 12f is pressed by bent portion 4b, so that sealing is improved.

When noise is generated in engine compartment X, grommet 10 mounted in panel 4 absorbs the noise by virtue of the air cushion contained in the closed space 16. Noise transmission is thus suppressed to the passenger compartment Y.

Figure 7:
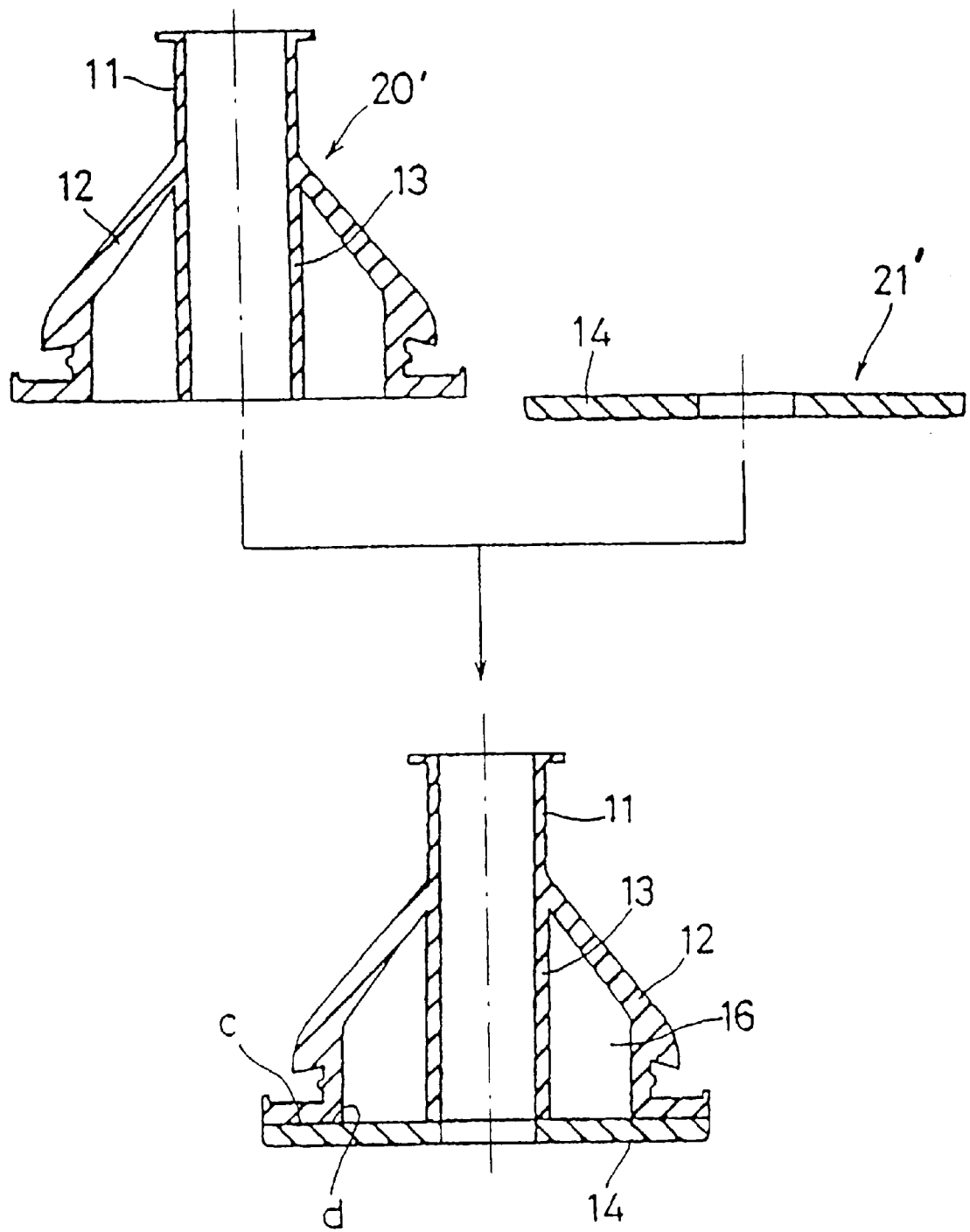
FIG. 7 schematically illustrates a process of manufacturing a grommet according to another embodiment of the present invention.

FIG. 7 shows another embodiment of the present invention. One difference with regard to the first embodiment is that the integrally-formed grommet core part 20' also comprises an internal tube portion 13, while the sub-part 21' comprises only the closing portion 14. Another difference is that the sub-part is formed of rubber made of a high-density material. To combine the grommet core part 20' and the sub-part 21', the end face c of the frustoconical tube portion 12 and corresponding surface d are put into contact and heated in a mold.

When the closing portion 14 is made of a high-density material, noise permeability is further reduced and noise shielding is further improved. The high-density material may also be used for the sub-part 21.

Figure 8:
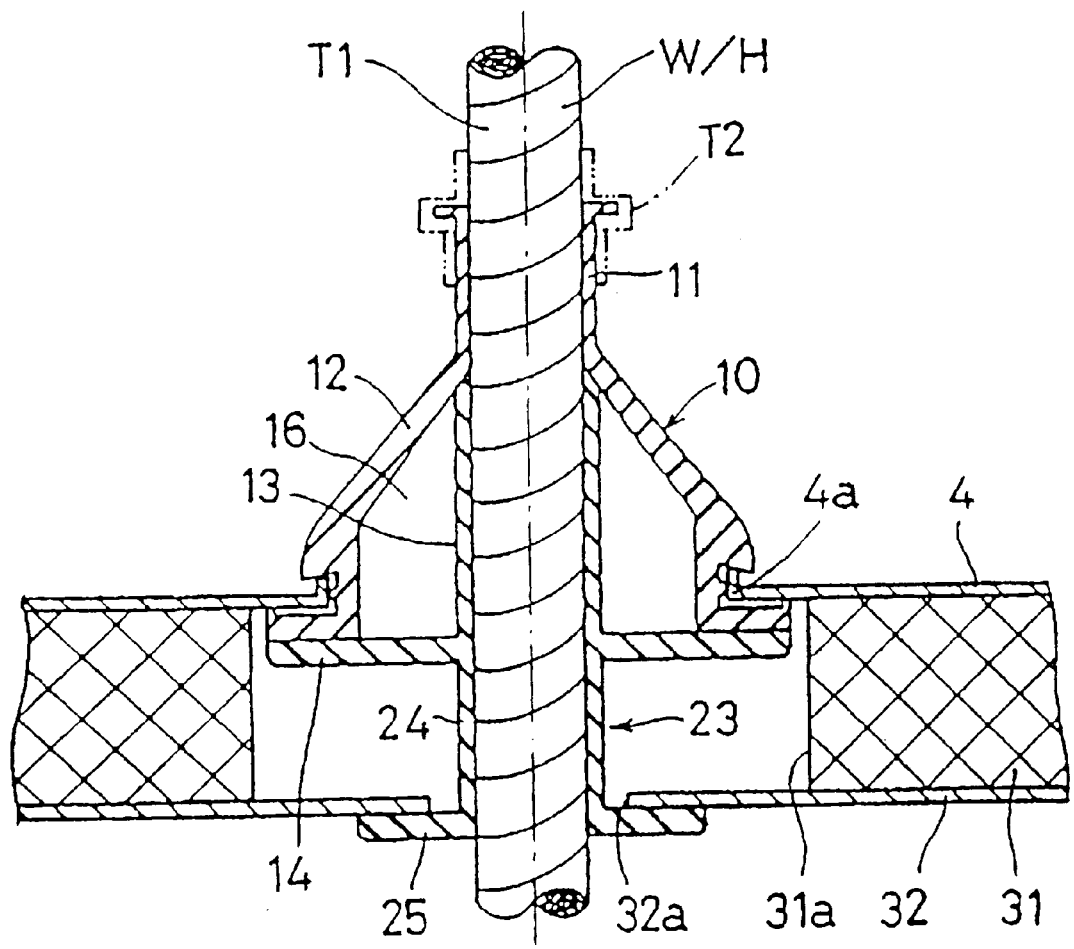
FIG. 8 illustrates the grommet according to another embodiment of the present invention mounted in an automobile body panel.
Figure 9:
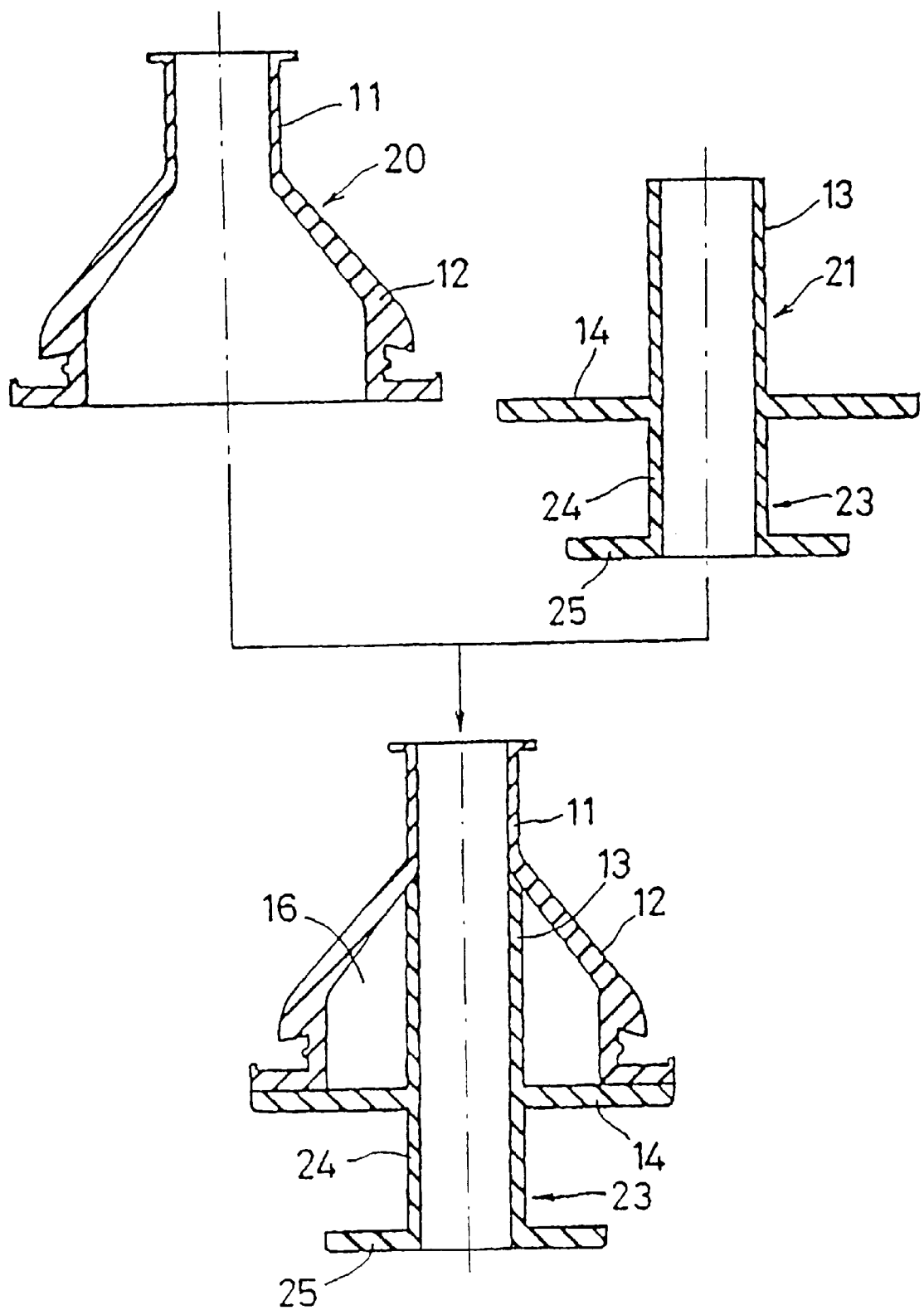
FIG. 9 schematically illustrates a process of manufacturing a grommet according to the embodiment of the present invention depicted in FIG. 8.

FIGS. 8 and 9 illustrate yet another embodiment of the present invention. In this embodiment, grommet 10 is mounted in the body panel 4 from the passenger side compartment and provided with a dash silencer on the passenger side. The dash silencer flanks a noise-absorbing material 31 inside the panel and is defined by a wall 32 made of resin. Through-holes 31a and 32a, respectively, are connected to the through-hole 4a of the panel 4.

The grommet according to this embodiment differs from that of the first embodiment in that a dash-silencer holding means 23 is provided in an extension of the end face of the internal tube portion 13. This holding means has a thrusting tube portion 24 extending from end face 13a, as well as a stopper flange 25 extending outwardly from the end portion of the thrusting tube portion 24. The thrusting tube portion 24 extends through the hole 31a of the noise-absorbing material 31, while the stopper flange 25 is passed through the hole 32a of the wall 32 and held thereby.

FIG. 9 shows a grommet 10 provided with a dash-silencer stopper flange 23. The grommet core part 20 is constructed as in the first embodiment. The grommet sub-part 21 is comprised of stopper flange 23, internal tube portion 13 and closing portion 14, which are placed in a mold in the presence of a vulcanizing agent and are heated until they become half-vulcanized. Then the grommet core part and the grommet sub-part are put into one mold, with the sites to be bound in corresponding positions, and molded, so that the two parts are integrally formed. Preferably, the sub-part 21 equipped with the stopper flange 23 is made of a high-density rubber.

Figure 10:
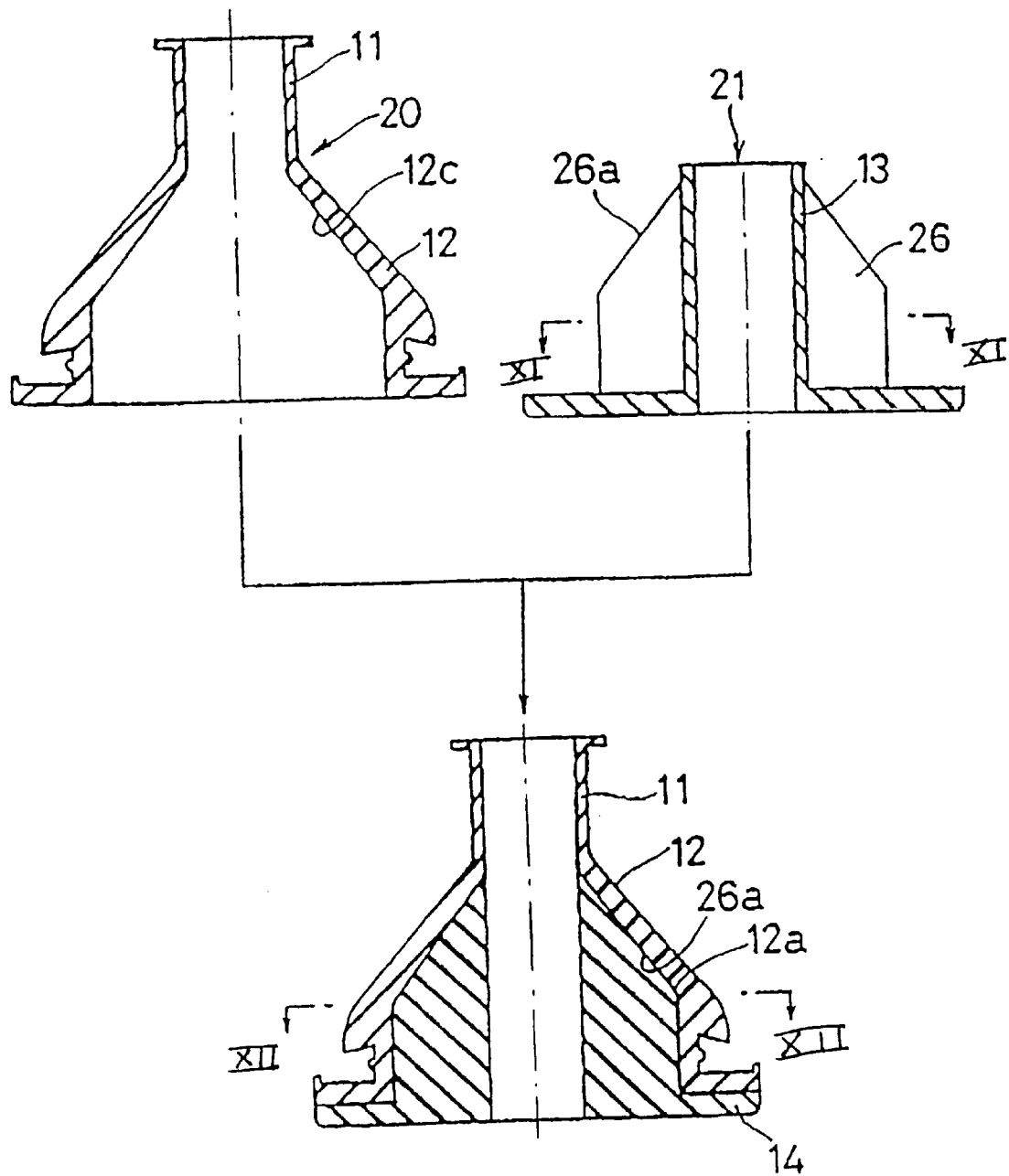
FIG. 10 schematically illustrates a process of manufacturing a grommet according to another embodiment of the present invention.
Figure 11:
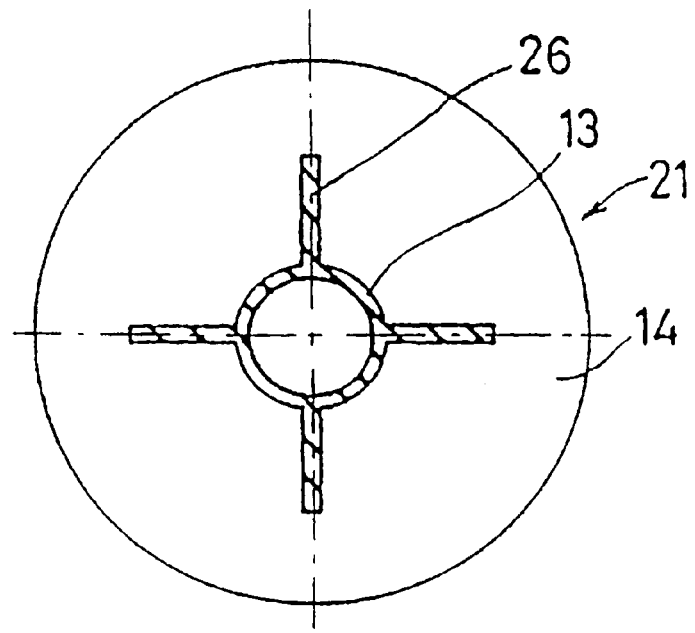
FIG. 11A illustrates a cross-sectional view of the grommet depicted in FIG. 10 taken along line XI—XI.
FIG. 11B illustrates a cross-sectional view of the grommet depicted in FIG. 10 taken along line XII—XII.

FIGS. 10 and 11 illustrate another embodiment of the present invention. In comparison with the first embodiment, the internal tube portion 13 of the sub-part 21 is provided with partitioning wall portions 26. These wall portions protrude radially and longitudinally from the circular outer surface of the internal tube portion 13 at 90° from one another. One end of the partitioning wall portions 26 is bound to a corresponding face of the closing portion 14. This sub-part 21 is combined with the grommet core part 20 and these parts are molded, such that the rim section 26a of each partitioning wall portion 26 and the inner surface 12c of the frustoconical tube portion 12 are integrally bound.

Figure 11B:
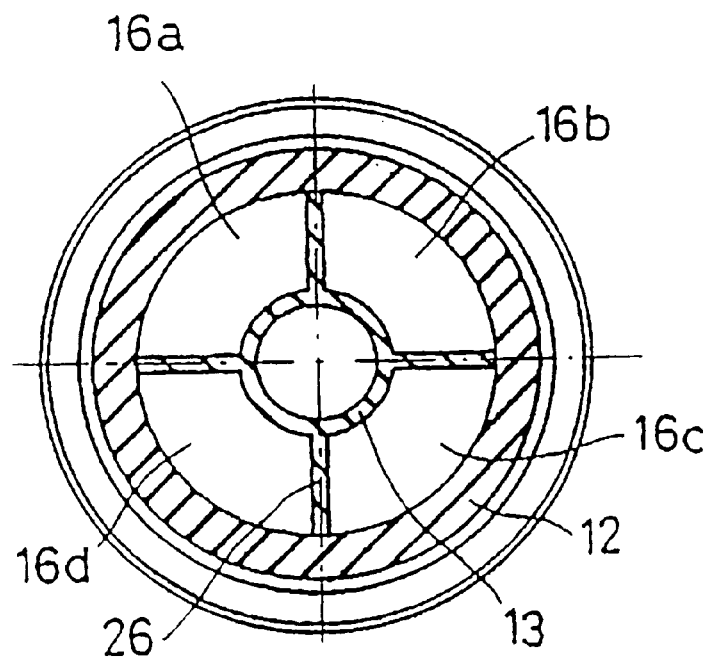

FIG. 11B illustrates a cross-sectional view of the above-mentioned embodiment. In this embodiment, the space formed by the internal tube portion 13, the frustoconical tube portion 12 and the closing portion 14 is separated into four closed spaces 16a, 16b, 16c, 16d by partitioning walls 26.

When the internal tube portion 13 and the frustoconical tube portion 12 are connected by the partitioning walls 26, the latter may be prevented from heat deformation and more firmly installed into the body panel.

Figure 12A:
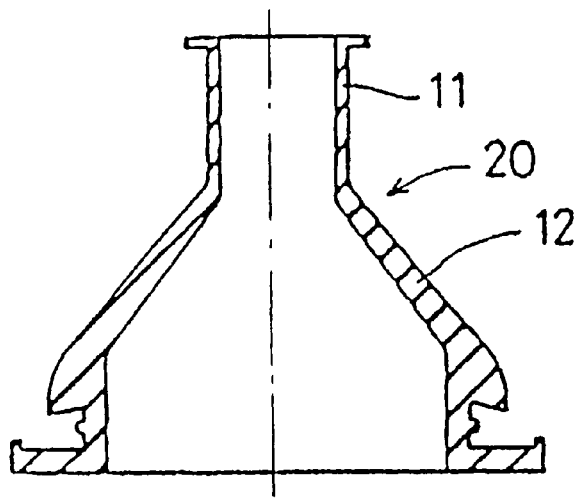
FIGS. 12A, 12B and 12C schematically illustrate a process of manufacturing a grommet according to yet another embodiment of the present invention.
Figure 12B:
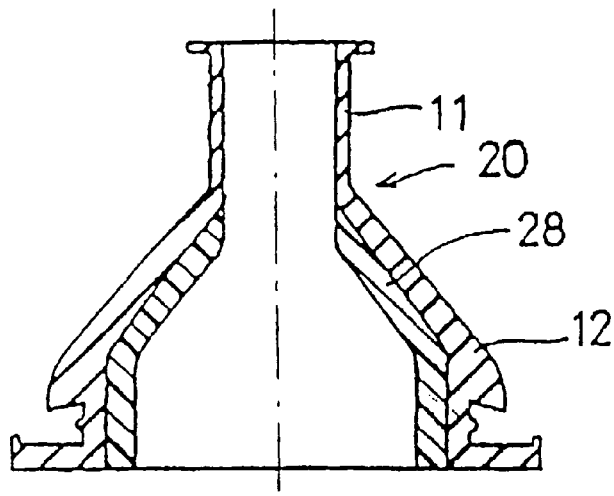
Figure 12C:
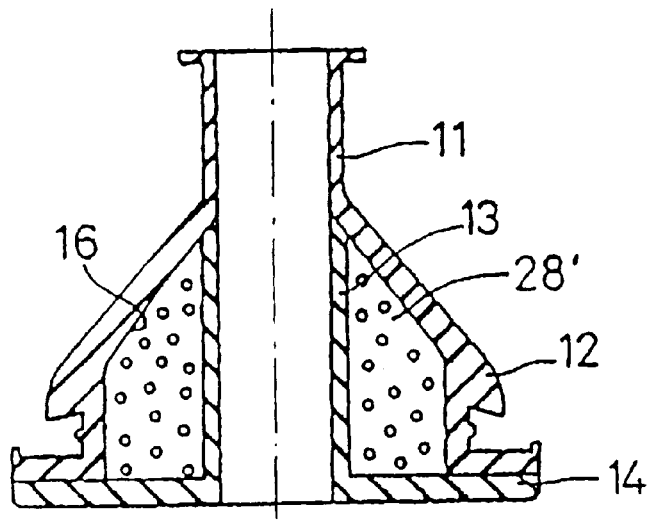

FIGS. 12A–12C illustrate yet another embodiment of the present invention. As shown in FIG. 12A, the grommet core part 20 is formed in a mold to give a half-vulcanized product. Then, as shown in FIG. 12B, a resin-foam material 28 is applied to the inner circular surface 12a of the frustoconical tube portion 12 to a predetermined thickness. Subsequently, this is put into a mold together with a sub-part comprising an internal tube portion 13 and a closing portion 14, and it is heated. As shown in FIG. 12C, the applied material 28 expands up to the outer circular surface of the internal tube portion 13, such that the closed space 16 formed by the above three portions becomes filled with an expanded material 28'. This material absorbs noise and improves the noise insulation of the grommet.

The wiring harness W/H is passed through the grommet, and a sealing product, such as urethane, can be applied from the side of the small tube portion; The sealing product can thus fill the air gap between electrical cables W of the harness W/H located in the small tube portion.

As is apparent from the above description, the grommet of the present invention is provided with a closed space formed by capping the flared end of frustoconical tube portion. This grommet may be mounted into the panel, for example, from the passenger side compartment. In that case, the noise formed in the engine compartment enters into the flared wall of the frustoconical tube portion and penetrates towards the opening thereof on the passenger side compartment. The closed space absorbs this noise by its air cushion and reduces or suppresses the passage of the noise toward the passenger compartment.

Further, the grommet of the present invention is provided with an anti-noise, closed space and may have no medium or solid sealing agents. The frustoconical tube portion can thus be easily deflected and the grommet is easily mounted into the through-hole of the body panel. As a result, noise shielding and workability are both improved. Moreover, the anti-noise grommet with such a closed space can be manufactured with rubber or an elastomer as an integral piece. Thus, the grommet is easily manufactured, without supplementary work of installing an anti-noise medium or seal. Productivity for grommet manufacturing is also enhanced.

In automobiles, it is very important to prevent noise from entering into the passenger compartment and thus render its passenger compartment more comfortable. To this end, noise leakage from the engine has to be reduced or suppressed. The grommet according to the invention suppresses low noise and lowers high noise. The noise leakage toward the passenger compartment is thus prevented or suppressed, so that the latter is rendered more comfortable.

The present invention claims the priority under 35 U.S.C. § 119 of Japanese Patent Application No. JP 8-203612 filed Aug. 1, 1996, the disclosure of which is expressly incorporated by reference herein in its entirety.

What is claimed is:

1. A grommet comprising:
    a small tube portion through which a wiring harness is passed, the small tube portion having an edge at one end thereof;
    a frustoconical tube portion extending from the edge of the small tube portion and having a flared-out portion and an inner surface and an outer surface, wherein a recess is formed on the outer surface of the frustoconical tube portion for fitting into an automobile body panel;
    an internal tube portion through which the wiring harness is passed, wherein the internal tube portion depends from the edge of the small tube portion, extends substantially along an axial direction in the frustoconical tube portion, and has an open edge and an outer surface; and
    a closing portion having a through-hole being substantially centrally located, the closing portion being connected to the open edge of the internal tube portion and to the flared-out portion of the frustoconical tube portion, whereby a cross-sectionally circular closed space surrounded by the outer surface of the internal tube portion, the inner surface of the frustoconical tube portion and the closing portion is formed.

2. The grommet according to claim 1, wherein the grommet is integrally formed of an elastic material.

3. The grommet according to claim 1, further comprising a flange portion for holding a dash silencer, wherein the flange portion depends from the open edge of the internal tube portion.

4. The grommet according to claim 3, wherein the flange portion comprises a tubular portion and an open end portion, the open end portion extending radially outwardly.

5. The grommet according to claim 1, wherein at least the internal tube portion and the closing portion are formed of a high-density elastic material.

6. The grommet according to claim 1, further comprising a plurality of internal wall portions protruding radially and longitudinally from the outer surface of the internal tube portion, whereby a cross-sectional circular closed space is partitioned into a plurality of sections.

7. The grommet according to claim 1, wherein the cross-sectional circular closed space contains an expanded material.

8. A method of manufacturing a grommet, the grommet being formed of an elastic material and comprising a small tube portion through which a wiring harness is passed, having an edge at one end thereof, a frustoconical tube portion extending from the edge of the small tube portion and having a flared-out portion and inner and outer surfaces, wherein on the outer surface of the frustoconical tube portion is formed a recess for fitting into an automobile body panel, an internal tube portion through which the wiring harness is passed, wherein the internal tube portion depends from the edge of the small tube portion, extending substantially along an axial direction in the frustoconical tube portion and having an open edge and an outer edge, and a closing portion having a through-hole being substantially centrally located, the method comprising:
    a) integrally forming the small tube portion and the frustoconical tube portion in a first mold in the presence of a vulcanizing agent, whereby a grommet core part which is half-vulcanized is provided;
    b) integrally forming the internal tube portion and the closing portion in a second mold in the presence of a vulcanizing agent, whereby a grommet sub-part which is half-vulcanized is provided, the grommet core part and the grommet sub-part having corresponding binding sites;
    c) placing the grommet core part and the grommet sub-part into a third mold, such that the corresponding binding sites are in contact; and
    d) heating the third mold until the grommet core part and the grommet sub-part become fully vulcanized, whereby the corresponding binding sites are melted and bound to yield the grommet.

9. The method according to claim 8, the method further comprising providing a flange portion for holding a dash silencer in the grommet sub-part.

10. The method according to claim 8, wherein the grommet core part is formed of a low-density material and the grommet, sub-part is formed of a high-density material.

11. A method of manufacturing a grommet, the grommet being formed of an elastic material and comprising a small tube portion through which a wiring harness is passed, having an edge at one end thereof, a frustoconical tube portion extending from the edge of the small tube portion and having a flared-out portion and inner and outer surfaces, wherein on the outer surface of the frustoconical tube portion is formed a recess for fitting into an automobile body panel, an internal tube portion through which the wiring harness is passed, wherein the internal tube portion depends from the edge of the small tube portion, extending substantially along an axial direction in the frustoconical tube portion and having an open edge and an outer edge, and a closing portion having a through-hole being substantially centrally located, comprising:

a) integrally forming the small tube portion and the frustoconical tube portion in a first mold in the presence of a vulcanizing agent, whereby a grommet core part which is half-vulcanized is provided;

b) forming the closing portion in a second mold in the presence of a vulcanizing agent, whereby a grommet sub-part which is half-vulcanized is provided, the grommet core part and the grommet sub-part having corresponding binding sites;

c) placing the grommet core part and the grommet sub-part into a third mold, such that the corresponding binding sites are in contact; and d) heating the third mold until said parts become fully vulcanized, whereby the corresponding binding sites are melted and bound to yield the grommet.

12. The method according to claim 11, the method further comprising providing a flange portion for holding a dash silencer in the grommet sub-part.

13. The method according to claim 11, wherein the grommet core part is formed of a low-density material and the grommet sub-part is formed of a high-density material.

* * * * *